(12) United States Patent
Shen et al.

(10) Patent No.: US 7,484,464 B2
(45) Date of Patent: Feb. 3, 2009

(54) ADHESIVE-BASED RECONFIGURABLE PALLET SYSTEM FOR ASSEMBLY LINES

(75) Inventors: Chi-Hung Shen, Troy, MI (US); Yhu-Tin Lin, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 351 days.

(21) Appl. No.: 10/721,598

(22) Filed: Nov. 25, 2003

(65) Prior Publication Data

US 2005/0109249 A1    May 26, 2005

(51) Int. Cl.
*B25B 1/24* (2006.01)
(52) U.S. Cl. .............. 108/56.3; 108/51.11; 269/266
(58) Field of Classification Search ............ 108/56.3, 108/56.1, 57.12, 51.11; 269/20, 266, 296, 269/309, 310, 900
See application file for complete search history.

(56) References Cited

U.S. PATENT DOCUMENTS

| | | | | |
|---|---|---|---|---|
| 4,848,005 A * | 7/1989 | Ercole et al. | ............ | 33/573 |
| 5,110,239 A * | 5/1992 | Riley et al. | ............ | 269/21 |
| 5,153,505 A * | 10/1992 | Abita et al. | ............ | 324/758 |
| 5,243,745 A * | 9/1993 | Varnau | ............ | 269/902 |
| 5,364,083 A * | 11/1994 | Ross et al. | ............ | 269/266 |
| 5,562,276 A * | 10/1996 | Blick | ............ | 269/20 |
| 5,722,646 A * | 3/1998 | Soderberg et al. | ............ | 269/266 |
| 5,829,151 A * | 11/1998 | Collier et al. | ............ | 33/573 |
| 5,837,901 A * | 11/1998 | Sola et al. | ............ | 269/21 |
| 5,984,293 A * | 11/1999 | Abrahamson et al. | ............ | 269/266 |
| 5,987,765 A * | 11/1999 | Sola et al. | ............ | 33/568 |
| 6,158,727 A * | 12/2000 | Fox | ............ | 269/296 |
| 6,408,767 B1 * | 6/2002 | Binnard et al. | ............ | 108/20 |
| 6,418,602 B2 * | 7/2002 | Crocker et al. | ............ | 29/714 |
| 6,644,637 B1 | 11/2003 | Shen et al. | | |
| 6,702,272 B2 * | 3/2004 | Monvavage | ............ | 269/266 |
| 7,076,856 B2 * | 7/2006 | Sarh | ............ | 29/715 |

FOREIGN PATENT DOCUMENTS

| JP | 57184028 | * 11/1982 | ............ | 108/55.3 |
|---|---|---|---|---|
| JP | 2003076290 | * 3/2003 | | |

* cited by examiner

*Primary Examiner*—Hanh V. Tran

(57) ABSTRACT

A reconfigurable pallet that supports a structure includes a pallet base and a plurality of modular stanchions that are adhesively secured to the pallet base. The modular stanchions are selectively positionable along x and y axes relative to a top surface of the pallet base. The modular stanchions each include a support element that has a height along a z axis that is transverse to the x and y axes. The support element supports the structure.

9 Claims, 4 Drawing Sheets

ADHESIVE-BASED RECONFIGURABLE PALLET SYSTEM FOR ASSEMBLY LINES

FIELD OF THE INVENTION

The present invention relates to assembly lines, and more particularly to a reconfigurable pallet for an assembly line.

BACKGROUND OF THE INVENTION

The advent of assembly lines enabled rapid, mass production of products, reduced product cost. Assembly lines typically include multiple operation stages and component, material or sub-assembly inputs. Typically, a base structure is supported on a pallet that is transferred through the assembly line. Operations are performed on the base structure at the various operation stages to produce an end product. A single assembly line can be used to assemble varying product types. For example, an assembly line can be configured to assemble a first engine type and then reconfigured to assemble a second, different engine type.

Typical pallets include upward extending stanchions that are fixed to a base. The stanchions include support elements that support the base structure. Each stanchion is fixed in a specific location on the base and includes a fixed height to vertically position the support element at a required support location. Traditionally, a specific pallet corresponds to a specific product type. For example, for the first and second engine types introduced above, a first pallet includes a stanchion configuration that supports the first engine type. A second pallet includes a different stanchion configuration to support the second engine type.

Traditional pallets are not interchangeable across product types because each pallet is specifically designed to support a specific product type. Because a unique pallet is required for each product type production costs increase. Such production costs include costs associated with designing, manufacturing and purchasing of each pallet type. Further, capital investment and longer lead times are required when transitioning between product types.

SUMMARY OF THE INVENTION

Accordingly, the present invention provides a reconfigurable pallet that supports a structure. The reconfigurable pallet includes a pallet base and a plurality of modular stanchions that are adhesively secured to the pallet base. The modular stanchions are selectively positionable along x and y axes relative to a top surface of the pallet base. The modular stanchions each include a support element that has a height along a z axis that is transverse to the x and y axes. The support element supports the structure.

In one feature, the x and y axes are parallel to a top surface of the pallet base and the z axis is perpendicular to the x and y axes.

In another feature, the support element is movable along the z axis to adjust the height. Each of said modular stanchions can include a support cylinder that is selectively actuated to move the support element to a position along the z axis. A hydraulic pump can be in fluid communication with the support cylinder and is operable to adjust a hydraulic pressure within the support cylinder to move the support element along the z axis.

In still another feature, each of the modular stanchions is adhered to the pallet base by an adhesive layer.

In yet another feature, each of the modular stanchions is adhesively bonded to the pallet base using a bonding pack. The bonding pack includes a stanchion base and a shim. The shim is adhesively attached to the stanchion base using a quick de-bonding adhesive. The shim is adhesively attached to the pallet base using a quick bonding adhesive.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
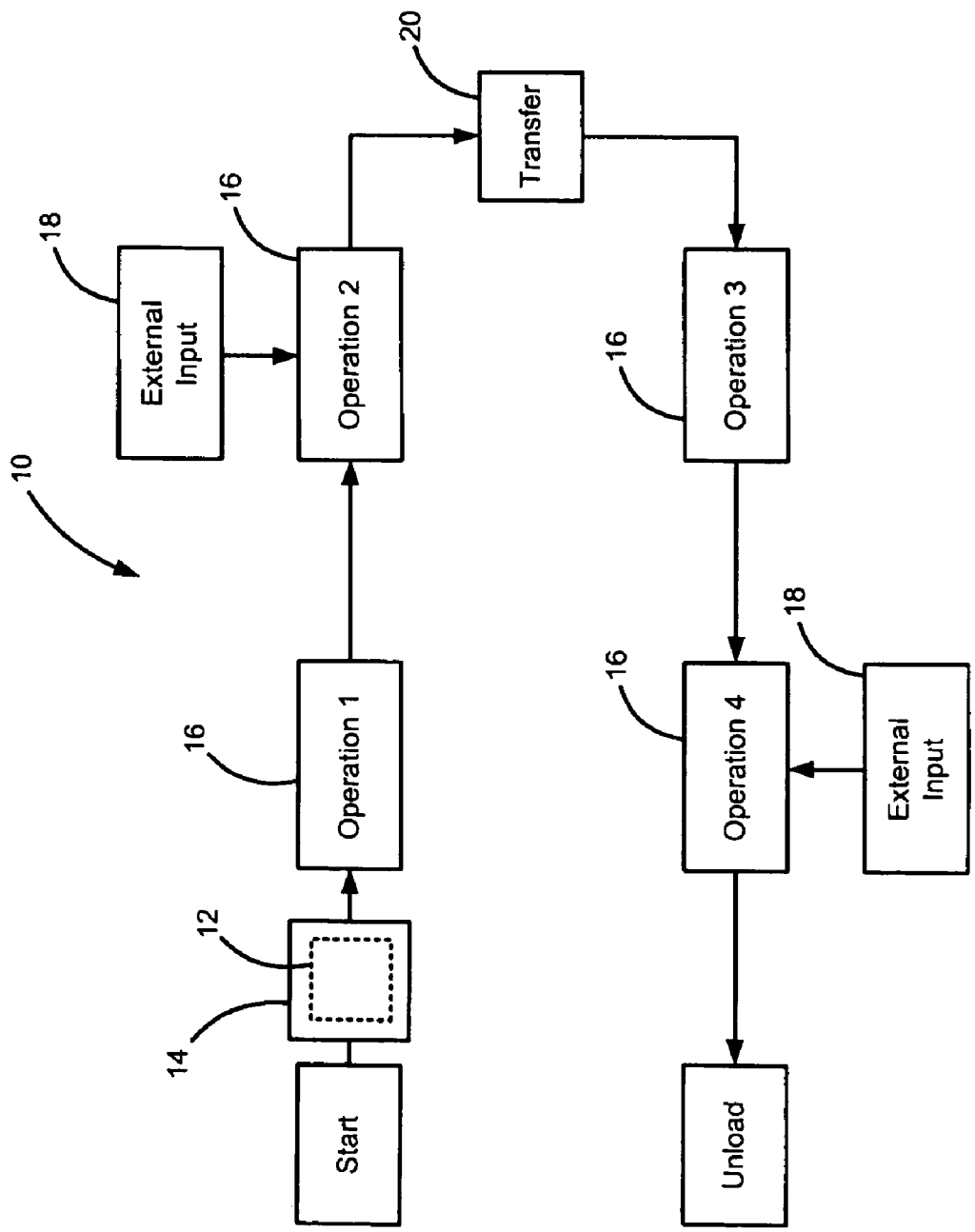
FIG. 1 is a schematic illustration of a generic assembly line.

Referring now to FIG. 1, a generic assembly line 10 is schematically illustrated. The assembly line 10 is illustrative of numerous types of assembly lines used across various industries. For example, the generic assembly line 10 can depict an engine, a chassis, a vehicle sub-assembly or any type of vehicle oriented assembly line. More broadly, the generic assembly line 10 can depict any type of assembly line across all industries.

A base structure 12 (shown in phantom) of a "to be assembled" product is moved through the assembly line 10 on a reconfigurable pallet 14. The generic assembly line 10 includes multiple operation stages 16. Single or multiple operations are performed on the product at each operation stage 16. Such operations include, but are not limited to assembling a component, welding, treating the base structure (e.g., heat treatment), applying sealant, adhesive or the like and packaging the assembled product for shipping. Other inputs 18 are also included such as a component input, a sub-assembly input or a material input. A transfer 20 is also provided to transfer the reconfigurable pallets 14 to other parts of the assembly line 10. It is appreciated that the assembly line 10 is merely exemplary in nature and can vary in configuration, the number of operation stages 16, the number and location of component, sub-assembly or material inputs 18, transfers 20 and the like.

Figure 2:
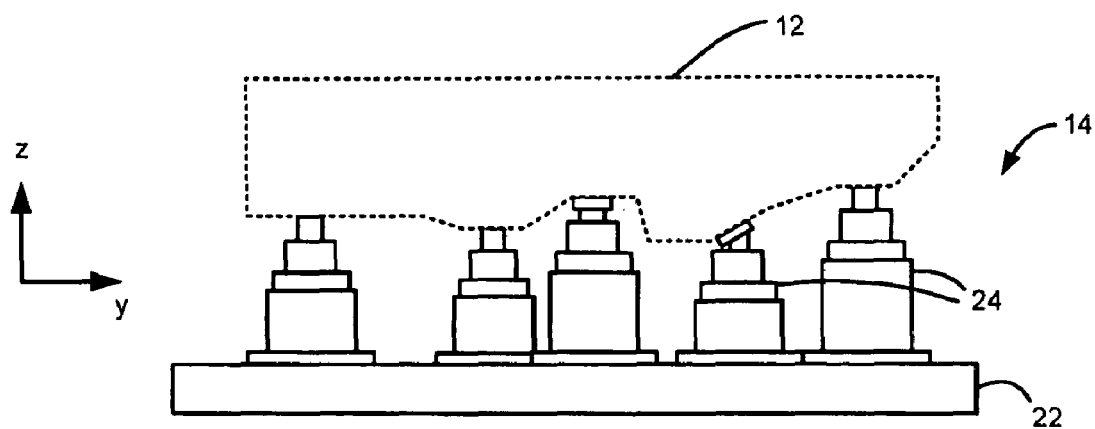
FIG. 2 is a schematic illustration of a reconfigurable pallet including modular stanchions.

Referring now to FIG. 2, the reconfigurable pallet 14 is illustrated. The reconfigurable pallet 14 includes a base 22 that supports multiple modular stanchions 24. The base material corresponds to the loads it is designed to carry. For example, the base 22 can be made of a strong metal material to support heavier products such as an engine. Other materials can be used to construct the base 22. The material is selected based on the type of load that it is required to support. The multiple modular stanchions 24 support the base structure 12 (shown in phantom) of a product as it is transferred through the various operation stages 16 of the assembly line 10. The product is representative of a generic product and can be any product that is assembled or treated along an assembly line. The modular stanchions 24 can be attached to or otherwise support the product.

Figure 3:
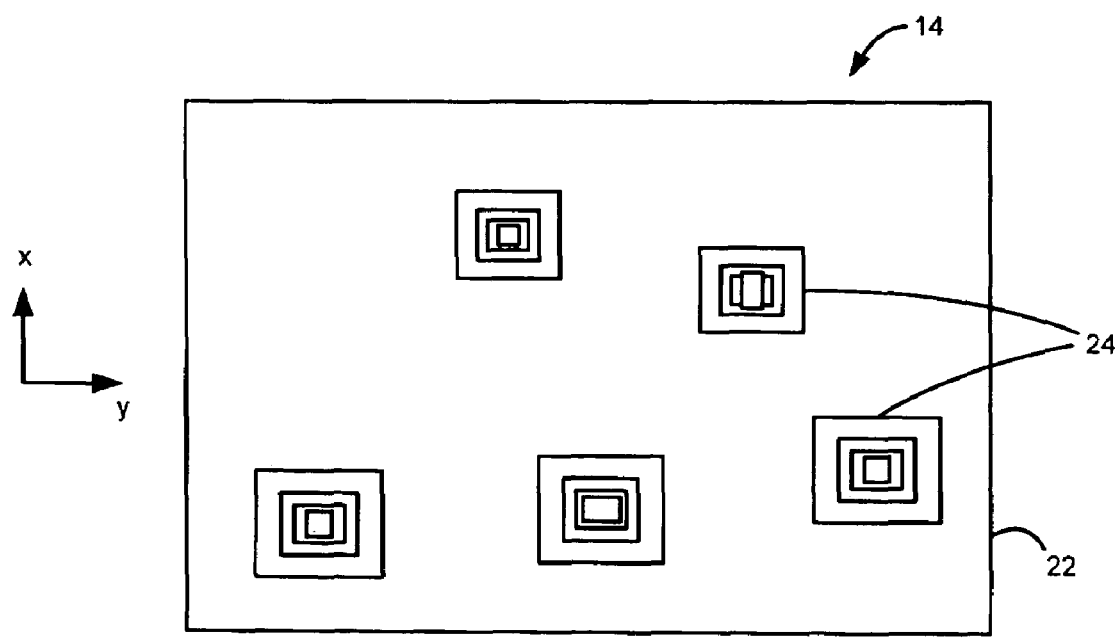
FIG. 3 is a top view of the reconfigurable pallet of FIG. 2.

As explained in further detail below, the modular stanchions 24 are adjustable to support various product types. The modular stanchions 24 can be positioned along x and y axes (see FIGS. 3 and 5) and also along a z axis (see FIGS. 2 and 4) transverse to the x and y axes. For example, the modular stanchions 24 can be arranged in a first configuration to support one engine type for assembly in the assembly line 10. The modular stanchions 24 can be reconfigured in a second configuration to accommodate a second engine type or another product altogether. In this manner, a single pallet 14 is reusable across assembly lines 10 and across products types.

Figure 4:
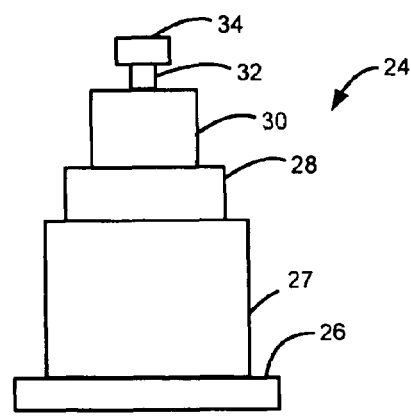
FIG. 4 is a schematic illustration of a modular stanchion of the reconfigurable pallet.

Referring now to FIG. 4, an exemplary modular stanchion 24 is shown. The modular stanchion 24 includes a stanchion base 26, a stanchion 27, a hydraulic fluid pump 28 and a support cylinder 30. The stanchion base 26 rests on the pallet base 22 and is selectively positionable along the x and y axes. The fluid pump 28 is supported on the stanchion base 26 and is in fluid communication with the support cylinder 30. The support cylinder 30 includes a rod 32 that has a support element 34 attached thereto. The rod 32 is laterally adjustable by varying the fluid pressure within the support cylinder 30.

The fluid pump 28 can be one of several types of fluid pumps known in the art including, but not limited to, a hydraulic screw-pump. Although not illustrated, a traditional hydraulic screw pump includes a hollow metal cylinder having a small opening at a closed end and a leak-free plunger screw-actuated at an open end. The small opening is connected to a hydraulic device such as a the support cylinder 30. When the plunger-screw is rotated clockwise, it moves axially inward, pressurizing the hydraulic fluid to actuate the hydraulic device. When the plunger-screw is rotated counterclockwise, it moves axially outward and thus decreases the fluid pressure and deactivates the hydraulic device. It is anticipated that the reservoir of oil inside the screw-pump can serve several hydraulic devices.

Actuation of the support cylinder 30 using the fluid pump 28 results in adjustment of the rod 32. Adjustment of the rod 32 enables positioning of the support element 34 along the z axis. In the event that the z axis position is outside of the range of the support cylinder 30, a gauge block or spacer (not shown) having an appropriate thickness can be implemented to raise the support cylinder 30. Alternatively, another support cylinder 30 having a longer stroke can be used.

The support elements 34 can vary in size and style between the modular stanchions 24. The support elements 34 include, but are not limited to, buttons, round locators, diamond locators and pads. The support elements 34 can be interchanged on the rods 32 of the support cylinders 30 and can be fixedly attached to the base structure 12 to secure the base structure 12 to the reconfigurable pallet 14. Additionally, such as in the case of a pad, the base structure 12 can rest on the support elements 34, held in place by gravity. It is also anticipated that the support elements 34 can be articulated in various directions to accommodate the contours of the base structure 12.

Although the exemplary modular stanchion 24 includes hydraulic adjustment of the support element 34 along the z axis, it is anticipated that other mechanisms can be incorporated to achieve lateral adjustment of the support element 34. For example, a mechanical mechanism such as a rack and pinion system driven by an electric motor can be employed to position the support element 34 along the z axis. Alternatively, an adjustable tube that is slidable along the z axis and lockable in position by a pin can be implemented.

It is further anticipated that fixed height modular stanchions (not shown) can be implemented. The fixed height stanchions are similarly constructed to the adjustable height modular stanchion 24 described above and include a stanchion base, a stanchion, a support column and the support element. Although the support elements can be interchanged, the height of the support column is fixed. This height can vary from stanchion to stanchion. For a given product type the z-axis coordinates for the various support elements can be predefined. The fixed height stanchions having the required z-axis height can be selected from a pool of fixed height stanchions and can be mounted to the pallet base to support the product.

The modular stanchions 24 are selectively attached to the pallet base 22 using an adhesive. The adhesive provides an interfacial joint between the stanchion base 26 and the pallet base 22. The adhesive preferably includes technical characteristics that enable simplicity and quick-configuration time. These technical characteristics include adequate bonding strength (e.g., >2000 psi), fast bonding time (e.g., <15 seconds), simple bonding process, fast de-bonding time (e.g., <15 seconds) and a simple de-bonding process. It is appreciated that the bonding strength and bonding/de-bonding times will vary based on application requirements and that the values provided herein are merely exemplary in nature.

Figure 5:
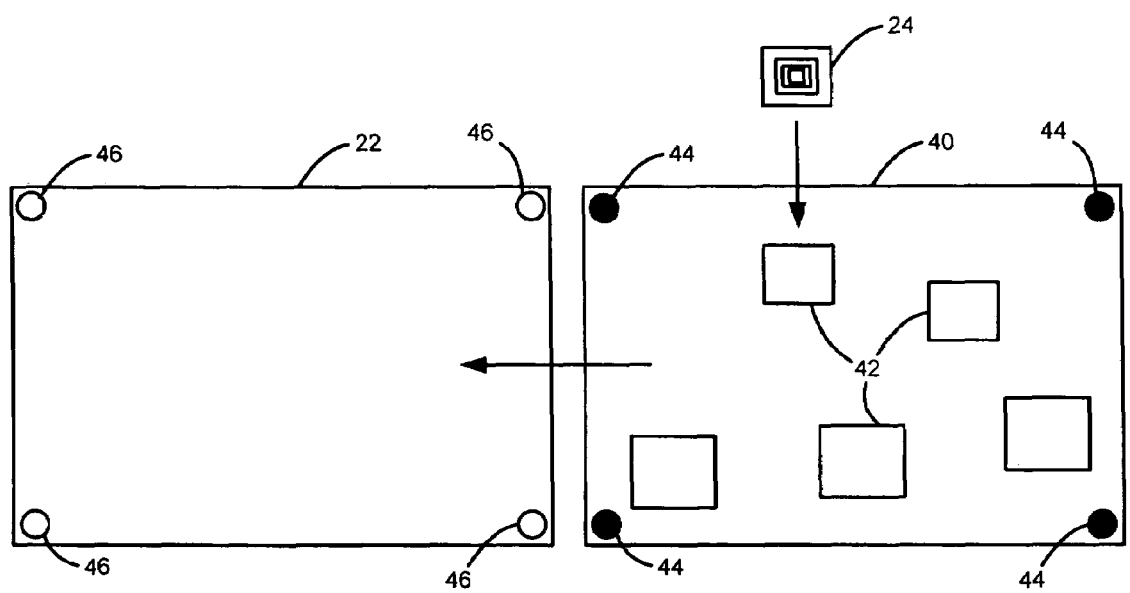
FIG. 5 is a schematic illustration of an assembly process for the reconfigurable pallet.

Referring now to FIG. 5, a process for attaching a modular stanchion 24 to the pallet base 22 will be described in detail. A prefabricated pre-form 40 is mounted to the pallet base 22 to define the x-y coordinates for each of the modular stanchions 24. More particularly, the pre-form 40 functions as a template having a plurality of openings 42 that define a pattern. The pre-form 40 also includes locating pins 44 that interface with locating holes 46 on the pallet base 22 to center the pre-form 40 on the pallet base 22.

The pre-form 40 is set atop the pallet base 22 with the locator pins 44 and holes 46 centering the pre-form 40 on the pallet base 22. An adhesive layer is applied to either the bottom of the stanchion base 26 or onto the top surface of the pallet base 22 in a space defined by the opening 42. The modular stanchion 24 is set atop the pallet base through the desired opening 42 and the adhesive layer cures, securing the modular stanchion 24 to the pallet base 22. Once all of the required modular stanchions 24 are secured to the pallet base 22, the pre-form 40 is lifted off and the pallet 14 is ready to be used. After use, the modular stanchions 24 are de-bonded from the pallet base 22 and the surface of the pallet base 22 is cleaned and prepared to receive an alternative modular stanchion configuration.

An alternative process for attaching the modular stanchion 24 to the pallet base can include a modified computer numerically controlled (CNC) x-y table or a robotic arm. The CNC table or robotic arm position the modular stanchions 24 at the appropriate x-y coordinates. The stanchion bases 26 are secured in position as described herein. An operator adjust the z-coordinate of each modular stanchion 24 in the case of an adjustable height modular stanchion 24. Adjustment of the z-coordinate can be achieved hydraulically or manually, as described above. The operator re-checks the x, y and z coordinates of each modular stanchion 24 then releases the reconfigurable pallet 14 for use in the assembly line 10.

Figure 6:
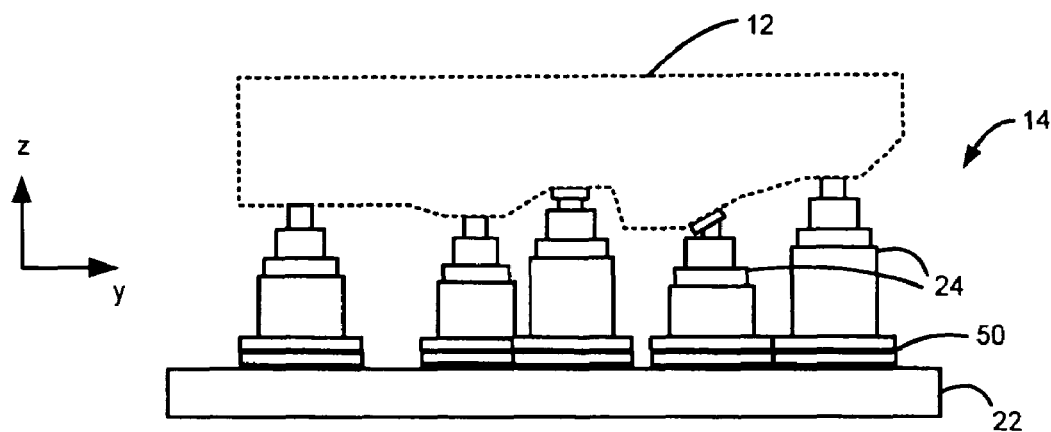
FIG. 6 is a schematic illustration of the reconfigurable pallet having the modular stanchions secured using bonding packs.
Figure 7:
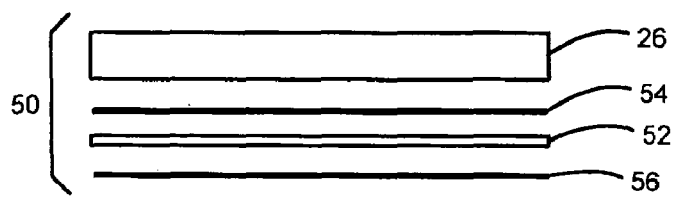
FIG. 7 is a schematic illustration of a bonding pack.
Figure 8:
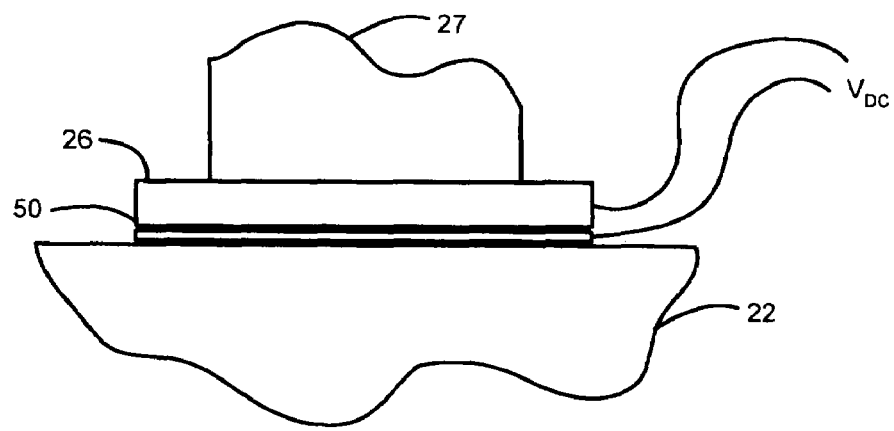
FIG. 8 is a schematic illustration of a de-bonding process of the bonding packs.

Referring now to FIGS. 6 through 8, an alternative process for attaching a modular stanchion 24 to the pallet base 22 will be described in detail. The process described with respect to FIG. 5 is the preferred process when using an adhesive that includes all of the technical characteristics except for quick de-bonding time, which is the case for most commercially available adhesives. Other adhesives, however, have been identified that include all of the technical characteristics except for quick bonding time. One such adhesive includes ElectRelease™ E4 manufactured by EIC Laboratories. E4 requires a curing time of approximately 24 hours with 1 hour at 80° C. E4, however, has a quick de-bonding time (approximately 15 seconds) by applying a low DC voltage (e.g., 50V) across the bonded components.

The alternative process combines the quick bonding time of a general adhesive and the quick de-bonding time of an adhesive such as E4. As best seen in FIG. 6, each of the modular stanchions 24 is bonded to the pallet base 22 by a bonding pack 50. The bonding pack 50 includes a shim 52 bonded to the bottom of the stanchion base 26 via a quick de-bonding adhesive layer 54. The bonding pack 50 is bonded to the pallet base 22 via a quick-bonding adhesive layer 56. Many bonding packs 50 can be made prior to assembling the pallets 14. In this manner, assembly time is not delayed by the time required for the quick de-bonding adhesive.

During assembly of the pallet 14, the pre-form 40 is aligned on the pallet base 22 as described above. The quick bonding adhesive layer 56 is applied to either the stanchion base 26 or the pallet base 22 in the area defined by the opening 42. The quick bonding adhesive layer 56 cures to secure the bonding pack 50 to the pallet base 22. After each of the required bonding packs 50 are bonded to the pallet base 22, the pre-form 40 is removed from the pallet base 22 and the remaining components of the modular stanchions 24 are secured to their respective stanchion bases 26.

During disassembly of the pallets 14, a low DC voltage is applied across the stanchion base 26 and the shim 52. Therefore, the stanchion base 26 and shim 52 are preferably formed of an electrically conductive material. The voltage de-bonds the modular stanchion 24 from the shim 52 and the modular stanchion 24 is removed from the pallet base 22. Each of the modular stanchions 24 are removed from the pallet base 22 leaving the shims 52 bonded to the pallet base 22 by the quick bonding adhesive layer 56. The shims 52 and quick bonding adhesive layer 56 are machined from the surface of the pallet base 22 and the pallet base is cleaned and prepared for an alternative modular stanchion configuration.

The alternative process described above combines the advantages of commercially available quick bonding adhesives and quick de-bonding adhesives. The quick bonding adhesives enable rapid attachment of the modular stanchions 24 to the pallet base 22 using the prefabricated bonding packs 50. The quick de-bonding adhesives enable rapid detachment of the modular stanchions 24 from the pallet base 22. This enables immediate use of the modular stanchions 24 on another pallet base 22, while the pallet base 22 is machined and cleaned.

Prior to use in the assembly line 10, the reconfigurable pallet 14 is configured to support the specific base structure 12 and product to be assembled. More specifically, the x, y and z positions of each modular stanchion 24 are adjusted and the support element 34 geometries are configured for the specific support requirements of the base structure 12. A dedicated set-up station (not shown) includes the bonding packs 50, in the case of a quick de-bonding adhesive, and the pre-forms 40 to position the modular stanchions 24 at the appropriate x-y coordinates. The stanchion bases 26 are secured in position as described above. An operator adjusts the z-coordinate of each modular stanchion 24, in the case of adjustable height modular stanchions, or secures appropriate fixed height modular stanchions to the pallet base 22. The operator re-checks the x, y and z coordinates of each modular stanchion 24 then releases the reconfigurable pallet 14 for use in the assembly line 10.

The reconfigurable pallet 14 of the present invention enables multiple spatial positioning for locating pins or support pads. Thus, the reconfigurable pallet 14 is adjustable to accommodate various product types. In this manner, significant savings is obtained by reducing design, engineering, manufacturing and purchasing of pallets for each product type. Further savings are achieved in the form of reduced capital investment and lead-time during transition between products.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reconfigurable pallet that supports a structure, comprising:
   a pallet base; and
   a plurality of modular stanchions that are adhesively secured to said pallet base and that are selectively positionable along x and y axes relative to a top surface of said pallet base, said modular stanchions each including a stanchion base and a support element that has a height along a z axis that is transverse to said x and y axes, said support element supporting said structure,
   wherein each of said modular stanchions is adhesively bonded to said pallet base using a bonding pack, said bonding pack including:
      a shim that enables said modular stanchion to be removed from said pallet base, said shim coupled to the bottom of said stanchion base via an adhesive layer; and
      a quick-bonding adhesive layer providing an interfacial joint between said modular stanchion and said pallet base,
      wherein said stanchion base and said shim are electrically conductive such that said stanchion base is removable from said shim by the application of an electric current to said modular stanchion.

2. The reconfigurable pallet of claim 1 wherein said x and y axes are parallel to a top surface of said pallet base and said z axis is perpendicular to said x and y axes.

3. The reconfigurable pallet of claim 1 wherein said support element is movable along said z axis to adjust said height.

4. The reconfigurable pallet of claim 3 wherein each of said modular stanchions further comprises a support cylinder that is selectively actuated to move said support element to a position along said z axis.

5. The reconfigurable pallet of claim 4 further comprising a hydraulic pump in fluid communication with said support cylinder and operable to adjust a hydraulic pressure within said support cylinder to move said support element along said z axis.

6. A reconfigurable pallet comprising:
   a pallet base;
   first and second structures; and
   a plurality of modular stanchions that are adhesively secured to said pallet base and that are selectively positionable along x and y axes relative to a top surface of said pallet base, said modular stanchions each including a stanchion base and a support element that has a height defined along a z axis transverse to said x and y axes, said support element having a first position to support said first structure and having a second position to support said second structure, wherein each of said modular stanchions is adhesively bonded to said pallet base using a bonding pack, said bonding pack including:

a shim bonded to the bottom of said modular stanchion via a quick-debonding adhesive layer; and a quick-bonding adhesive layer providing an interfacial joint between said shim and said pallet base, said interfacial joint bonds said shim to said pallet base such that said shim is configured to be removed from said pallet base to reconfigure said pallet, wherein said stanchion base and said shim are electrically conductive such that said stanchion base is removable from said shim by the application of an electric current to said modular stanchion.

7. The pallet of claim 6 wherein said support element is movable along said z axis to adjust said height.

8. The pallet of claim 6 wherein each of said modular stanchions further comprises a support cylinder that is selectively actuated to move said support element to a position along said z axis.

9. The pallet of claim 8 further comprising a hydraulic pump in fluid communication with said support cylinder and operable to adjust a hydraulic pressure within said support cylinder to move said support element along said z axis.

* * * * *